(12) United States Patent
Attenburg et al.

(10) Patent No.: US 9,489,636 B2
(45) Date of Patent: Nov. 8, 2016

(54) TASK-AGNOSTIC INTEGRATION OF HUMAN AND MACHINE INTELLIGENCE

(71) Applicants: Tagasauris, Inc., New York, NY (US); New York University, New York, NY (US)

(72) Inventors: Joshua M. Attenburg, Brooklyn, NY (US); Panagiotis G. Ipeirotis, New York, NY (US)

(73) Assignees: Tagasauris, Inc., New York, NY (US); New York University, New York, NY (US)

( * ) Notice: Subject to any disclaimer, the term of this patent is extended or adjusted under 35 U.S.C. 154(b) by 369 days.

(21) Appl. No.: 13/863,751

(22) Filed: Apr. 16, 2013

(65) Prior Publication Data

US 2013/0282630 A1    Oct. 24, 2013

Related U.S. Application Data

(60) Provisional application No. 61/635,202, filed on Apr. 18, 2012.

(51) Int. Cl.
*G06N 99/00* (2010.01)
*G06N 5/02* (2006.01)

(52) U.S. Cl.
CPC .............. *G06N 99/005* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 6,658,287 B1 * | 12/2003 | Litt | A61B 5/0476 600/544 |
| 7,028,253 B1 * | 4/2006 | Lieberman | G06F 17/30265 345/625 |
| 8,001,532 B1 * | 8/2011 | Jakubiak | G06F 11/3684 714/46 |
| 8,554,605 B2 * | 10/2013 | Oleson | G06Q 10/06311 705/319 |
| 8,626,545 B2 * | 1/2014 | Van Pelt | G06Q 10/06398 705/317 |
| 2002/0103793 A1 * | 8/2002 | Koller | G06F 17/30469 |
| 2003/0105589 A1 * | 6/2003 | Liu | G06F 17/30017 702/1 |
| 2004/0015386 A1 * | 1/2004 | Abe | G06Q 10/06375 705/7.29 |

(Continued)

OTHER PUBLICATIONS

Brian M. Bowen, "Design and Analysis of Decoy Systems for Computer Security", PhD Thesis, Columbia University, 2011.*

(Continued)

*Primary Examiner* — Kakali Chaki
*Assistant Examiner* — Fuming Wu
(74) *Attorney, Agent, or Firm* — Paul Frank + Collins P.C.

(57) ABSTRACT

A system combines inputs from human processing and machine processing, and employs machine learning to improve processing of individual tasks based on comparison of human processing results. Once performance of a particular task by machine processing reaches a threshold, the level of human processing used on that task is reduced.

20 Claims, 3 Drawing Sheets

(56) References Cited

U.S. PATENT DOCUMENTS

| | | | | |
|---|---|---|---|---|
| 2004/0117239 | A1* | 6/2004 | Mittal | G06Q 30/02 705/7.32 |
| 2007/0149952 | A1* | 6/2007 | Bland | G06F 19/345 604/890.1 |
| 2007/0150024 | A1* | 6/2007 | Leyde | A61B 5/0476 607/45 |
| 2007/0150025 | A1* | 6/2007 | Dilorenzo | A61B 5/0476 607/45 |
| 2007/0234282 | A1* | 10/2007 | Prigge | G06F 8/00 717/107 |
| 2007/0282814 | A1* | 12/2007 | Gupta | G06F 17/27 |
| 2007/0287931 | A1* | 12/2007 | Dilorenzo | A61B 5/0476 600/545 |
| 2008/0225870 | A1* | 9/2008 | Sundstrom | G06Q 10/10 370/401 |
| 2009/0024504 | A1* | 1/2009 | Lerman | G06Q 40/06 705/35 |
| 2010/0023307 | A1* | 1/2010 | Lee | G05B 23/0254 703/7 |
| 2010/0083145 | A1* | 4/2010 | Schang | G06Q 10/06 715/760 |
| 2010/0248194 | A1* | 9/2010 | Renduchintala | G09B 5/02 434/169 |
| 2011/0052067 | A1* | 3/2011 | Cobb | G06K 9/6222 382/190 |
| 2011/0052068 | A1* | 3/2011 | Cobb | G06K 9/00771 382/190 |
| 2011/0213784 | A1* | 9/2011 | Udupa | G06F 17/3061 707/747 |
| 2011/0313801 | A1* | 12/2011 | Biewald | G06Q 10/0631 705/7.12 |
| 2011/0313820 | A1* | 12/2011 | Biewald | G06Q 10/06311 705/7.42 |
| 2013/0282630 | A1* | 10/2013 | Attenberg | G06N 5/02 706/12 |
| 2014/0039985 | A1 | 2/2014 | Oleson et al. | |
| 2014/0122188 | A1* | 5/2014 | Van Pelt | G06Q 10/06398 705/7.42 |

OTHER PUBLICATIONS

Lieberman et al., "An Agent for Integrated Annotation and Retrieval of Images," Paper initially presented at Workshop on Personal Photo Libraries: Innovative Designs University of Maryland, Jun. 1, 2000.*

Figueroa et al., "Predicting sample size required for classification performance," BMC Med Inform Decis Mak. 12:8. doi: 10.1186/1472-6947-12-8, Feb. 15, 2012.*

Figueroa et al., "Predicting sample size required for classification performance," BMC Medical Informatics and Decision Making 2012, 12:8 (10 pages), 2012.*

"Amazon Mechanical Turk," 2005-2013, Amazon.com, Inc., 1 page, [Online] [Retrieved on Jul. 31, 2013] Can be retrieved on the Internet at<URL:https://www.mturk.com/mturk/welcome>.

"Scale-Invariant Feature Transform," Wikipedia, Last Modified Jun. 1, 2013, 14 pages, [Online] [Retrieved on Jul. 31, 2013] Can be Retrieved on the Internet at<URL:http://en.wikipedia.org/wiki/Scale-invariant_feature_transform>.

Attenberg, J.M. et al., "Beat the Machine: Challenging Workers to Find the Unknown Unknowns," Papers from the 2011 AAAI Workshop on Human Computation (HCOMP), 2011, pp. 2-7.

Fink, E. et al., "Application of Machine Learning and Crowdsourcing to Detection of Cybersecurity Threats," Computer Science, Carnegie Mellon University, 2011, pp. 1-12.

Tamuz, O. et al., "Adaptively Learning the Crowd Kernel," Proceedings of the 28th International Conference on Machine Learning, ICML, 2011, 10 pages, vol. 9.

Von Ahn, L. et al., "reCAPTCHA: Human-Based Character Recognition via Web Security Measures," Science, Sep. 12, 2008, pp. 1465-1468, vol. 321, 5895.

* cited by examiner

TASK-AGNOSTIC INTEGRATION OF HUMAN AND MACHINE INTELLIGENCE

CROSS REFERENCE TO RELATED APPLICATIONS

This application claims the benefit of U.S. Provisional Application No. 61/635,202, filed Apr. 18, 2012, which is incorporated by reference herein in its entirety.

BACKGROUND

1. Technical Field

The subject matter described herein generally relates to the field of artificial intelligence and, more particularly, to systems and methods for teaching machines to mimic human processing using crowd-sourced prediction.

2. Background Information

Crowdsourcing has emerged as an effective answer to a variety of problems, ranging from the discovery of innovative solutions to open challenges in research, to the use of humans for performing tiny tasks that are easy for humans, yet remain difficult for even sophisticated algorithms. Amazon's Mechanical Turk, specifically, has proven to be an innovator in crowdsourcing technology, allowing computers to get programmatic access to human intelligence, through an API: computer programs could post micro-tasks on the Amazon Mechanical Turk market and on the other side of the API a human could complete the task and send back the answer. See https://www.mturk.com/mturk/welcome.

The introduction of such products and services gave birth to a new "crowdsourcing-based" industry, which promises to create solutions for a variety of problems that were so far too difficult to tackle using computers. Due to the extremely low costs often associated with crowdsourcing, crowdsourcing-based services have been introduced for many problem domains in which it was possible, albeit expensive, to develop automatic solutions.

The use of crowdsourcing to improve machine learning algorithms is a topic that attracted significant interest over the last few years. For example, the ReCAPTCHA project is using crowdsourcing human intelligence to recognize words in scanned documents that are not recognizable by existing OCR systems. Then the data are being used to train further and hopefully improve the existing automatic OCR system. See Luis von Ahn, Ben Maurer, Colin McMillen, David Abraham and Manuel Blum (2008), "reCAPTCHA: Human-Based Character Recognition via Web Security Measures" (PDF), Science 321 (5895): 1465-1468. Another system uses crowds to learn a human-based similarity kernel to understand what images are similar. Omer Tamuz, Ce Liu, Serge Belongie, Ohad Shamir, and Adam Tauman Kalai (2011), Adaptively Learning the Crowd Kernel, ICML: 9. Still another related approach is a crowdsourcing website to share cybersecurity threat information, and then use the data to learn models that detect malicious websites. Eugene Fink, Mehrbod Sharifi, and Jaime G. Carbonell (2011), Application of Machine Learning and Crowdsourcing to Detection of Cybersecurity Threats. Computer Science, Carnegie Mellon University.

Nonetheless, some attempted solutions applying blind adoption of crowdsourcing have been regressive and have failed to take advantage of decades of research in computer science. It would be advantageous if there were a system and method that consistently learned how to perform tasks from observing human behavior and, once a threshold level of performance has been reached for a particular task, inserted machine processing of that task in place of human processing.

Figure 1:
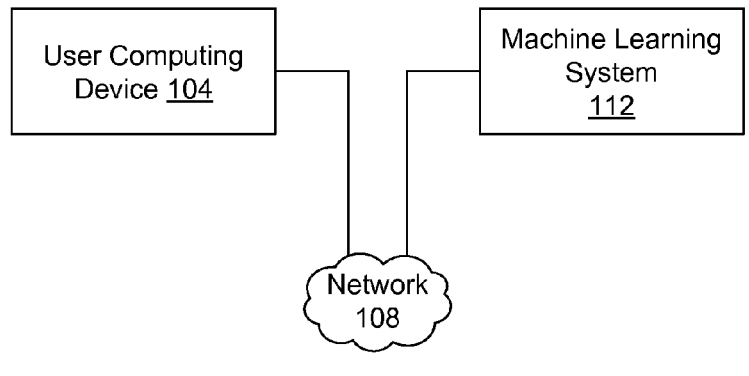
FIG. 1 illustrates a system environment of a machine learning system using both user input and machine learning algorithms to improve the performance of task-agnostic machine learning, in an embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Machine/Human Processing Overview

Embodiments described herein meld machine learning with human intelligence, with the ultimate goal of replacing manual, crowdsourced solutions with automatic, machine-based solutions. Machine learning algorithms are used in a completely task-agnostic fashion, gradually learning human responses to a certain task. That is, the system observes user actions in response to all tasks monitored by the system, and continuously attempts to learn how to automate the manual actions of humans; this leads to higher efficiency, lower cost, and gradually increased automation. The system agnostically and ubiquitously tries to learn every human action that happens within the system, regardless of whether it involves image tagging, speech recognition, classification, etc.

As described herein human or user "action," includes any single action or set of actions that are involved in the completion of a task. For example, if the task for the user is that of classifying a product, the described embodiments will automatically attempt to learn the category of the product that is classified by the user. In another example, if the task for the user is that of audio transcription, the described embodiments will automatically attempt to learn the correct transcription from the audio file. In still another example, if the task for the user is image tagging, the described embodiments will attempt to learn the keywords assigned by a human to the image. In yet still another example, for a task of checking the image tags for correctness, the described embodiments will try to learn to vet or validate the tags automatically, as opposed to waiting for a human user to see the image and their corresponding tags, and decide whether the tags are appropriate or not. Hence the system does not require any manual tinkering or domain customization before leveraging human input towards the generation of automatic, algorithmic decision-making systems Machine learning models are continuously trained taking the human ("user") input as the target "label" (i.e., the function to be learned), and using as features any aspects of the user input. As more and more data collection from humans is undertaken, the performance of the machine learning models tend to increase. For some tasks, machine learning algorithms reach a point where they perform as well as the users; in this case, the task is completely or partially delegated to automated algorithms based on factors such as tolerance for error and availability of resources. For other tasks, the machine learning algorithms are less able to learn a model with high predictive power. In this, case user input continues to be the resource used to perform the task.

Thus, rather than ignoring progress in computer science in preference to user input from crowd-sourcing, machine learning algorithms of the present disclosure automatically and transparently learn from human input, and over time relieve humans from doing "intellectually menial" tasks.

FIG. 1 illustrates a system environment 100 for combining task-agnostic machine learning with collected user judgments for improving the performance of machine learning systems. The system environment 100 includes at least one user computing device 104, a network 108, and a machine learning system 112.

The user computing device 104 is configured for transmitting and/or receiving data from a user via the network 108. In one example, the user computing device 104 is used for supplying tasks for evaluation by a user and for receiving input, whether a decision or action (described collectively as "action" for brevity), from the user regarding the task. These actions are then transmitted from the user computing device 104 through the network 108 to the machine learning system 112 for evaluation and improvement of machine learning algorithms, as described herein. In one embodiment, the user computing device 104 is a conventional computer system, such as a desktop or laptop computer. In another embodiment, the user computing device 104 is a device having computer functionality, such as a personal digital assistant (PDA), mobile telephone, smart-phone or similar device. In one example, the user computing device 104 executes a browser application to enable interaction between user computing device 104 and the machine learning system 112 via the network 108. In another example, the user computing device 104 interacts with machine learning system 112 through an application programming interface (API) that runs on the native operating system of the user computing device, such as iOS® or ANDROID™.

The user computing device 104 is configured to communicate via the network 108, which comprises any combination of local area and/or wide area networks, using both wired and wireless communication systems, in some examples. In one embodiment, the network 108 uses standard communications technologies and/or protocols. Thus, various examples of the network 108 include links using technologies such as Ethernet, 802.11, worldwide interoperability for microwave access (WiMAX), 3G, 4G, CDMA, digital subscriber line (DSL), etc. Similarly, some examples of the networking protocols used on the network 108 include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 108 is represented in some examples using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The machine learning system 112 is configured for receiving and analyzing user actions relating to tasks, evaluating the user actions, and providing training tasks to users and machine learning algorithms to improve the operation of machine learning algorithms. The machine learning system 112 is described in more detail in the context of FIG. 2.

Example System Architecture

Figure 2:
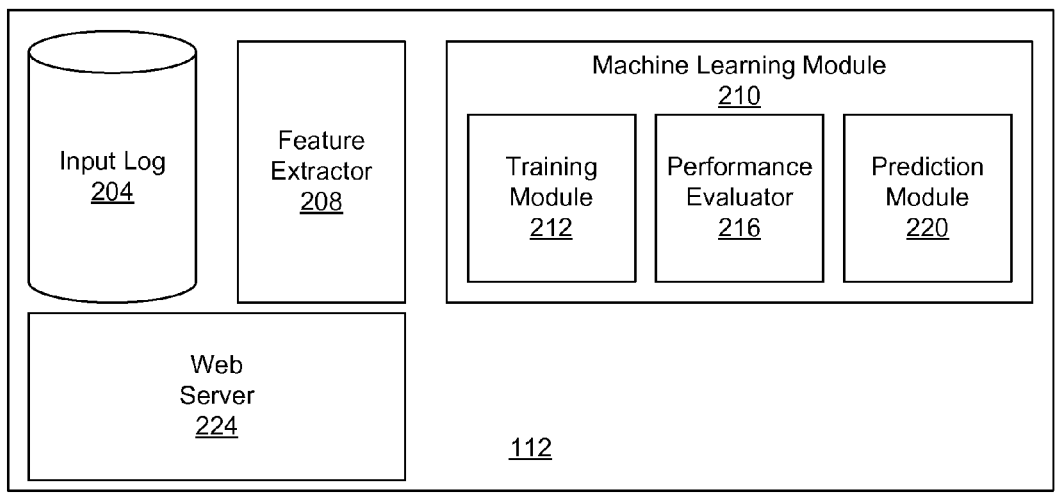
FIG. 2 illustrates a block diagram of a machine learning user input and machine learning algorithms to improve the performance of task-agnostic machine learning, in an embodiment.

In the example shown in FIG. 2, the machine learning system 112 includes an input log 204, a feature extractor 208, and a machine learning module 210. The machine learning module 210 includes a training module 212, a performance evaluator 216, and a prediction module 220. The machine learning system 112 also includes a web server 224. In other embodiments, the machine learning system 112 may include additional, fewer, or different modules for various applications. Conventional components such as network interfaces, security mechanisms, load balancers, failover servers, management and network operations consoles, and the like are not shown so as to not obscure the details of the system architecture.

The input log 204 of the machine learning system 112 receives user actions related to a task transmitted from the user computing device 104 through the network 108 to the machine learning system 112. The input log 204 stores the received user actions and also indexes the received actions according to the type of action and the type of object on which the action was performed. This configuration permits the machine learning system 112 to analyze user actions in the context of their respective tasks.

The input log 204 receives user actions related to every task performed on a media object by users, not merely a limited set of tasks defined by a conventional machine learning algorithm of limited analytical scope. This identification of user actions independent of the corresponding tasks (referred to as "task-agnostic") enables the machine learning system 112 to analyze a broader set of user actions on any of a variety of media objects and apply the analysis more generically, thereby improving the usefulness and versatility of the system. This is in contrast to traditional machine learning systems, which are typically configured to analyze only a narrow set of specific tasks.

The tasks provided to users by the machine learning system 112 and the user actions recorded in the input log 204 are task-agnostic because actions are analyzed based on the type of media object instead of based on a specific task. For example, rather than defining a machine learning algorithm that is limited to learning a specific classifier for a single action performed on a specific media object, the methods and systems of the present disclosure analyze multiple different types of actions performed on media objects. That is, all user actions are analyzed by the machine learning system 112, without knowing what exactly the task subject is, and without any attempt to customize or optimize any aspect of the system to facilitate learning for a specific task. For example, the methods and systems applied by the machine learning system 112 need not be adapted to specific subject matter and specific tasks, for example identifying adult content on a webpage, but rather are used to analyze any webpage regardless of its subject matter.

The feature extractor 208 extracts task-agnostic features vectors from the user-provided actions stored in the input log 204, thereby developing a data set of task-agnostic features that are be applied generically to a variety of machine learning algorithms, subject matter, and a variety of user actions. To accomplish the extraction of task-agnostic features, the feature extractor 208 does not merely extract action-specific features and custom-built models for different actions. Rather, the feature extraction algorithm of the feature extractor 208 is kept as generic as possible by defining a set of media objects (e.g., photos, documents, audio, video), rather than a set of specific actions, that are analyzed using a set of generic feature extractor processing modules for each type of media object. That is, for each type of media object in the set, the object type is determined (e.g., text, image, video, audio), and then some or all known feature extractors are operated on the object of the determined media type. For example, if an object is identified as a text document, all feature extractors, including but not limited to a "bag-of-words" feature extractor, are used to analyze the user actions performed on the text object. This object-based feature extraction then enables analysis of any of a variety of user actions that are performed on any of the media object types in the set.

For example, the feature extractor 208 analyzes text documents using a text processing module by extracting keywords from the text of documents. Keywords are identified by, for example, using a word occurrence frequency model (colloquially described as "a bag-of-words" representation). The most frequently occurring words, omitting articles, transitions, and the like, are selected as keywords. In other embodiments, the keyword identification includes using identified text fields, such as terms used in a title, a summary, an abstract, a first sentence of a paragraph, or other field occurring in the text document. In yet other embodiments, keywords are identified by identifying a name in the text, whether of an individual or an entity. These names are identified by using a reference database and/or publicly accessible algorithms including, for example, ThompsonReuters OpenCalais, Google Refinery, Zemanta, and others.

In another example, the feature extractor 208 analyzes media objects of digitally recorded images or photos by extracting information using an image processing module. Examples of image information that are extracted include, but are not limited to, color intensity, color distribution, brightness, and other features easily extracted by image processing software packages such as Adobe Lightroom. In another example, for images, the feature extractor performs a Scale-invariant feature transform (SIFT) to extract features that identify objects. This is described in more detail at http://en.wikipedia.org/wiki/Scale-invariant feature transform, incorporated by reference herein. In other embodiments, a face recognition module is applied to the image to determine whether faces are presence, the gender of the faces in the photo, and/or the identity of the face. These sets of features are embodied in vectors of numeric values.

In another example, the feature extractor 208 analyzes media objects of digitally recorded audio objects. The feature extractor 208 uses a variety of feature extraction approaches including, but not limited to frequencies, loudness, Linear Predictor Coefficients (LPC), Line Spectral Frequency (LSF) coefficients and others. Further examples include the extraction of text transcripts using a speech recognition extractor. Further examples of feature extraction include, but are not limited to feature extraction techniques for imaging, e.g., edge and corner detection, scale invariant feature transform (SIFT) features, and other features such as those described at http://en.wikipedia.org/wiki/Feature_extraction#Image_processing, and incorporated herein by referenced.

In still another example, a media object also includes prior actions executed by users on another media object and recorded in the machine learning system 112. For example, a media object that includes a two-step user task in which one user tags an image and provides a caption in a first step, and another user checks whether the tags and the description are correct in a second step, the media object consists of features automatically extracted from the image by the feature extractors (these will become features derived by the media objects), together with the tags, and description provided by the users in first step (and these are the features extracted by the user actions). That is, the machine learning system 112 evaluates related actions in the aggregate. For example, a first user posts an image to a web site, which is then commented on by a second user, and the comment is used for an action by a third user. In this example, the machine learning system 112 evaluates the action performed by the third user in the context of the image and the comment. In other examples, features are extracted from other types of media objects using similar techniques and any of a variety of feature extraction algorithms, such as those described above.

To facilitate the analysis of user actions provided by the input log 204, the feature extractor 208 also includes an action library. The action library includes a variety of reference actions that have been characterized to facilitate the identification of user actions performed on objects and provided to the system 112.

The combined features extracted from a media object are then combined into an overall numeric vector representing all that is known about an object. The combined feature vector is then provided to the machine learning module 210, which includes the training module 212, the performance evaluator 216, and the prediction module 220. These components of the machine learning module 210 operate to, as described above, learn from user-provided input so that machine input replaces user input.

Training module 212 uses the user-provided actions and the combined feature vectors to generate training data. The training data includes user-provided actions for a task that are matched with generic features extracted from the task and generalized using feature extraction from media objects, as described above in the context of the feature extractor 208.

The training module 212 also analyzes the received user-provided actions to generate a training set of data that expands quickly because of the task-agnostic characterization of user actions. That is, because the analysis of tasks is not limited to only user actions for a specific task but rather is generalized to a user actions related to a media object, many more types of user actions are used for the analysis. This process generates over time an increasingly larger training set, which is used to train a machine learning model that provides estimates of the probable future actions of humans when faced with a task.

The performance evaluator 216 then uses cross-validation to determine the performance of the machine learning model on unknown data. The training data is split into N portions. N−1 portions are used as training data, and while the remaining one (or "$N^{th}$") portion is used to measure how well the model built using the N−1 portions predicts the human actions recorded in the one remaining portion. The performance is then used to determine or estimate a number of user actions to be requested by the machine learning system 112 for a given level of performance, treating effectively the machine model as yet another participant in the system.

The performance evaluator 216 determines the worker quality and answer quality component using, for example, an algorithm developed at Project Troia (http://www.project-troia.com). Answers received from various users for the same question are aggregated into a single answer, while at the same time estimating the quality of each worker and weighing in parallel the answers of the workers accordingly, to give higher weight to the answers of the more accurate workers. The performance evaluator 216 estimates the quality of each user and the overall quality for the generated data. These data are used by the system 112 to determine whether the automatic system is used to replace one or more of the users.

In response to determining the number of user actions requested for a given media object, the training module initiates a number of training sessions, each using a different machine learning model in the machine learning module 210. The results for each of these machine learning models is evaluated by the performance evaluator 216 to determine a preferred model for the object.

The training module 212 constructs and/or augments a training set as new user input is received. Periodically, upon accumulating sufficient new user answers (e.g., 10-20 new user answers, depending on the statistical confidence interval desired), the training module 212 launches a training phase of a machine learning algorithm of the machine learning module 210. The machine learning module 210 executes a validation process (e.g., 10-fold cross validation) to measure the performance of performance of the machine learning system by testing the accuracy of actions provided by the machine learning module 210.

The performance evaluator 216 determines the marginal improvement for each answer of the new training set not only of the machine learning module 210, but also of the users. Both of these performance levels are be determined in the context of a target quality (or accuracy) level. Furthermore, in some examples the performance evaluator 216 is used to store targets for quality, accuracy, speed, cost, and other target metrics. In other examples, these metrics are associated with operational aspects of the system 112. In one example, the system 112 passively monitors user actions until it has collected enough data so that is predictive accuracy exceeds that of the average user accuracy and/or has achieved a minimum quality level.

The prediction module 220 uses the machine learning algorithm of the machine learning module 210 as described above, to predict user actions for objects. That is, rather than soliciting crowd-sourced user actions for an object, the prediction module 220 applies the machine learning methods and systems described herein to predict user actions instead of resorting to user input.

The web server 224 serves web pages, as well as other web-related content, such as JAVA®, FLASH®, XML and so forth. The web server 232 provides, in some examples, the functionality of receiving and routing data between the user computing device 104 and the system 112 by, for example, instant messages, queued messages (e.g., email), text and SMS (short message service) messages, web page actions, or data sent using any other suitable technique. Additionally, the web server 232 provides, in some examples, application programming interface (API) functionality to send data directly to native client device operating systems, such as iOS®, ANDROID™, webOS® or RIM. The web server 224 also provides API functionality for exchanging data, such as user actions, between the machine learning system 112 and the user computing device 104.

Example Applications

The system is applied in some examples to situations in which the system learns quickly, and therefore learns to predict user actions quickly. In one example, the task to be learned is monitoring comments of a blog, for spam and other inappropriate content. A crowd-sourcing-based solution is deployed in which humans inspect the blog comments and decide whether they are spam or not. For additional accuracy, multiple humans are employed to judge every comment. Such a solution results in a typical cost of approximately one cent per comment. Deploying the system and methods of the present disclosure, user responses are recorded when they inspect the comment. The system 112 begins automatically building a machine learning model that classifies comments as spam or not. Example covariates include extracting the words in the blog post and the words in the comment, treating both as generic text containers. The machine learning system 112 then considers the responses of humans as targets in the training data. After just a couple of thousand human judgments, the machine learning model trained using the collected data has an accuracy comparable to that of humans. (The accuracy of the model is assessed in this example using asynchronous cross-validation, or using future human judgments that were not used as part of the training set.) Once the system 112 performance is comparable to the performance of humans, the number and role of users is reduced (e.g., reduce the number of human judgments from three per comment to one per comment), or remove the need for human input altogether.

In another example, the machine learning system 112 builds its predictive power as a function of a targeted quality (or accuracy) of prediction and as a function of the number of users from which the system learns. For example, a target quality level of the machine learning system 112 for predicting user actions is 90%. For the same user action on a set of objects, users are known to have an average quality of approximately 80%. Because the users do not deliver actions meeting the quality target, 5 additional workers are used per object to reach the promised quality.

Initially, for example, in one embodiment at 100 user actions or fewer, the machine learning system 112 does not have sufficient data to quickly improve its predictive accuracy enough to match the quality of the users. At this sample size of completed actions, the machine learning system 112 learns passively, and does not interfere with the rest of the system.

At some point in this embodiment, at approximately 100-200 user actions, the machine learning system 112 has collected sufficient user actions so that the quality of its predictions begins to outperform the users. The machine learning system 112 then replaces one or more of the existing workers, effectively reducing costs.

After having collected enough user actions (in the example above, between 200-500 examples, depending on the underlying algorithm used), the machine learning system 112 can predict user actions at the targeted quality level of 90%, replacing crowd-sourced actions with the predictions of the system.

An additional benefit of the task-agnostic machine learning system 112 is that it measures its own performance (e.g., quality) compared to user performance. In one example, the system 112 does not interfere with the user-based operations unless it meets a quality target, cost target, speed target, and/or other performance targets provided to the performance evaluator 216.

Figure 3:
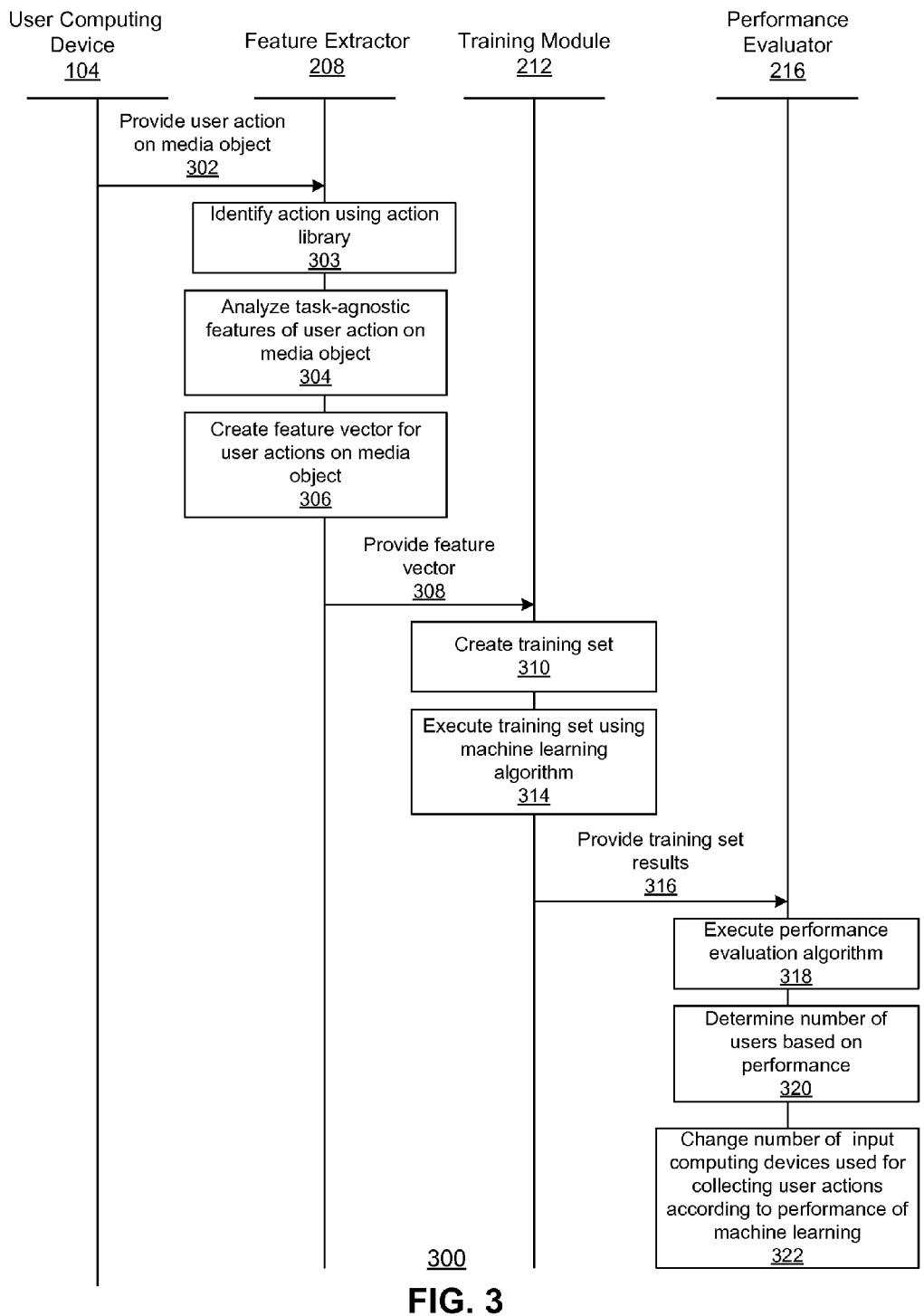
FIG. 3 is an interaction diagram showing one example of the interactions between various components of a machine learning system, in an embodiment.

FIG. 3 is an interaction diagram showing an example method 300 of the interactions between various components of a machine learning system 112, in an embodiment. A user action on a media object is provided 302 from the user computing device 104 to the feature extractor 208 of the machine learning system 112. The feature extractor 208 identifies the provided user action 303 using the action library and analyzes 304 task-agnostic features of the user action on the related media object, as described above. Using the identified action and the analyzed features, the feature extractor 208 creates 306 a feature vector for the user actions performed on the media object and for the media object.

The feature vector is provided 308 to the training module 212, which uses the provided feature vector to create 310 a training set, as described above. The training set is then executed 314 and the results provided 316 to the performance evaluator 216.

The performance evaluator 216 executes the performance evaluation algorithm 318 by, as described above, dividing the training data into N portions and testing the predictive performance of the system 112 base on N−1 portions against the $N^{th}$ portion. Based on the results of the performance evaluation algorithm, the number of users is determined 320 using quality (e.g., predictive accuracy), cost, cycle time, or other metrics for judging the performance of the system 112. The number of input computing devices is then changed 322, or not, based on the number of users used for crowdsourcing actions.

Computing Machine Architecture

Figure 4:
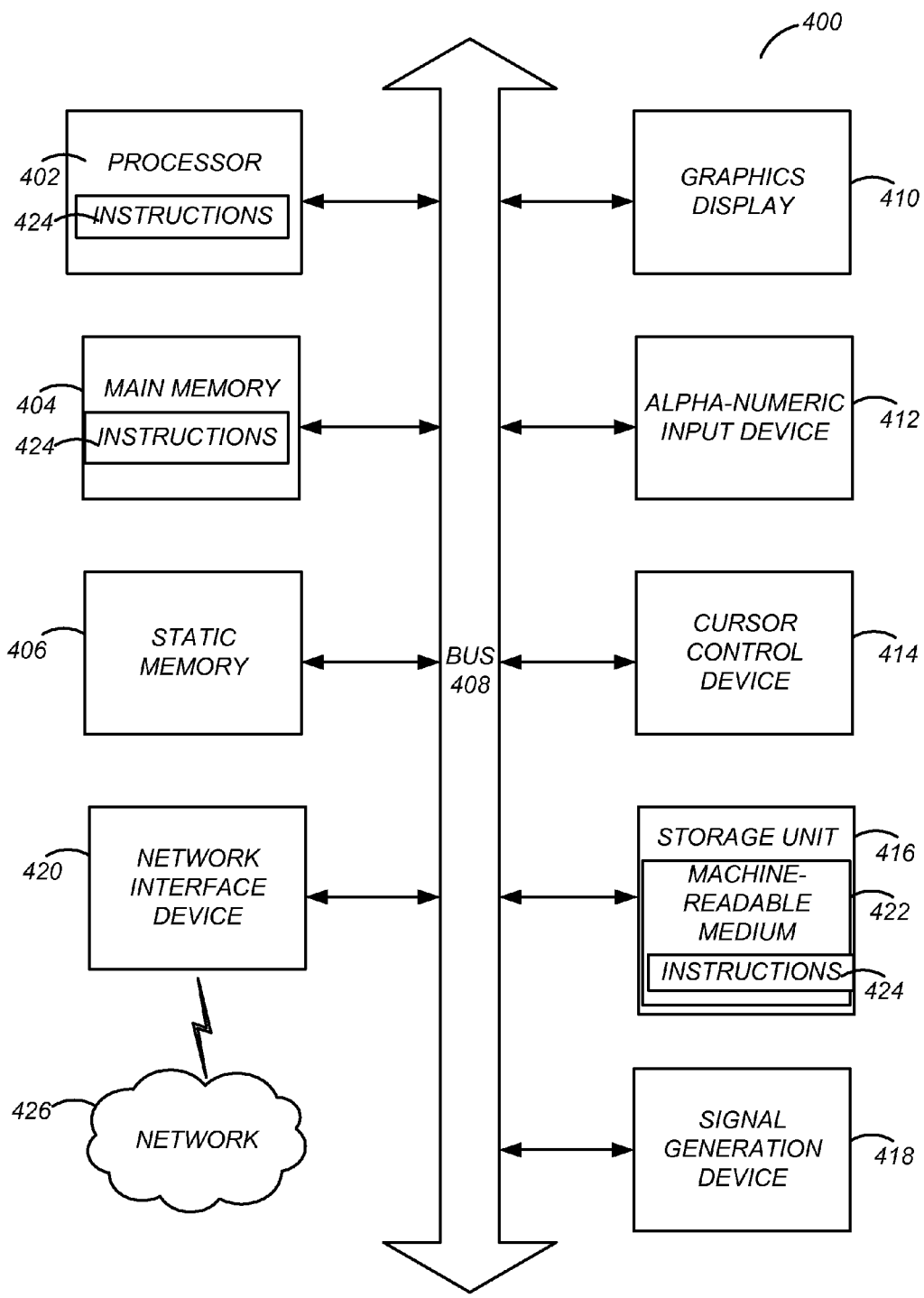
FIG. 4 illustrates components of an example machine able to read instructions from a machine-readable medium and execute those instructions in a processor.

FIG. 4 is a block diagram illustrating components of an example machine able to read instructions from a machine-readable medium and execute those instructions in a processor to perform the machine processing tasks discussed herein. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. In various examples, a module is implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 4. Alternatively, hardware or software modules may be stored elsewhere within a computing system.

As referenced herein, a computer or computing system includes hardware elements necessary for the operations described here regardless of specific reference in FIG. 4 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the described embodiments. This description should be read to include one or at least one and the singular also includes the plural unless it is obvious that it is meant otherwise.

Upon reading this disclosure, those of skill in the art will appreciate still additional alternative structural and functional designs for a system and a process for providing machine learning and replacement of human processing with machine processing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

What is claimed is:

1. A computer-implemented method comprising:
receiving at least one user action from a user input device, the at least one user action including a plurality of actions performed on an object;
determining a type of object that includes the object on which the at least one user action was performed;
determining a feature vector of the at least one user action and the object type on which the at least one user action was performed;
using the at least one user action and the feature vector to create a set of training data, the training data used to predict future user actions for objects of the type and to determine an accuracy of the predicted future user actions; and
selecting a sample size of users from which to receive additional user actions for the object, the sample size selected responsive to the determined accuracy of the predicted future user actions, the sample size reflecting an extent to which the predicted future user actions substitute for the at least one user action from the user input device, substitution beginning at least in response to the determined accuracy of the predicted user actions being at or near the accuracy of the at least one user action and the extent of substitution increasing over time as the determined accuracy of predicted user actions improves relative to the accuracy of the at least one user action.

2. The method of claim 1, wherein the at least one user action corresponds to more than one classifier performed on a specific object.

3. The method of claim 1, wherein the feature vector is determined using a plurality of feature vector extraction algorithms for the object type.

4. The method of claim 1, wherein the feature vector is determined by including at least two user actions corresponding to at least two related objects, the feature vector determined by analyzing the at least two user actions in aggregate.

5. The computer-implemented method of claim 1, wherein the at least one user action associates keywords with an image.

6. The computer-implemented method of claim 1, further comprising:
extracting information from media objects, wherein the feature vector relates to the information.

7. The computer-implemented method of claim 6, wherein the media object comprises one or more digitally recorded images.

8. The computer-implemented method of claim 6, wherein the media object comprises digitally recorded audio.

9. The computer-implemented method of claim 1, further comprising:
referencing an action library comprising a variety of reference actions; and
using the variety of reference actions to identify the at least one user action.

10. The computer-implemented method of claim 1, further comprising:
identifying a number of the additional actions using cross-validation on the set of training data.

11. A non-transitory computer-readable medium that includes instructions that, when loaded into memory, cause a processor to perform a method, the method comprising:
receiving at least one user action from a user input device, the at least one user action including a plurality of actions performed on an object;
determining a type of object that includes the object on which the at least one user action was performed;

determining a feature vector of the at least one user action and the object type on which the at least one user action was performed;

using the at least one user action and the feature vector to create a set of training data, the training data used to predict future user actions for objects of the type and to determine an accuracy of the predicted future user actions; and selecting a sample size of users from which to receive additional user actions for the object, the sample size selected responsive to the determined accuracy of the predicted future user actions, the sample size reflecting an extent to which the predicted future user actions substitute for the at least one user action from the user input device, substitution beginning at least in response to the determined accuracy of the predicted user actions being at or near the accuracy of the at least one user action and the extent of substitution increasing over time as the determined accuracy of predicted user actions improves relative to the accuracy of the at least one user action.

12. The non-transitory computer-readable medium of claim 11, wherein the at least one user action corresponds to more than one classifier performed on a specific object.

13. The non-transitory computer-readable medium of claim 11, wherein the feature vector is determined using a plurality of feature vector extraction algorithms for the object type.

14. The non-transitory computer-readable medium of claim 11, wherein the feature vector is determined by including at least two user actions corresponding to at least two related objects, the feature vector determined by analyzing the at least two user actions in aggregate.

15. The non-transitory computer-readable medium of claim 11, wherein the at least one user action associates keywords with an image.

16. The non-transitory computer-readable medium of claim 11, further comprising:
extracting information from media objects, wherein the feature vector relates to the information.

17. The non-transitory computer-readable medium of claim 16, wherein the media object comprises one or more digitally recorded images.

18. The non-transitory computer-readable medium of claim 16, wherein the media object comprises digitally recorded audio.

19. The non-transitory computer-readable medium of claim 11, further comprising:
referencing an action library comprising a variety of reference actions; and
using the variety of reference actions to identify the at least one user action.

20. The non-transitory computer-readable medium of claim 11, further comprising:
identifying a number of the additional actions using cross-validation on the set of training data.

* * * * *